(12) United States Patent
Thomasset (10) Patent No.: US 12,528,631 B2
(45) Date of Patent: Jan. 20, 2026

(54) PACKAGING IN WHICH THE WELD IS CONCEALED IN THE PRINT AND MANUFACTURING METHOD

(71) Applicant: AISAPACK HOLDING SA, Vouvry (CH)

(72) Inventor: Jacques Thomasset, Neuvecelle (FR)

(73) Assignee: AISAPACK HOLDING SA, Vouvry (CH)

( * ) Notice: Subject to any disclaimer, the term of this patent is extended or adjusted under 35 U.S.C. 154(b) by 272 days.

(21) Appl. No.: 18/556,157

(22) PCT Filed: Apr. 22, 2022

(86) PCT No.: PCT/IB2022/053779
§ 371 (c)(1),
(2) Date: Oct. 19, 2023

(87) PCT Pub. No.: WO2022/229809
PCT Pub. Date: Nov. 3, 2022

(65) Prior Publication Data
US 2024/0190632 A1    Jun. 13, 2024

(30) Foreign Application Priority Data
Apr. 26, 2021  (EP) .................................. 21170375

(51) Int. Cl.
*B65D 75/06* (2006.01)
*B29C 65/20* (2006.01)

(52) U.S. Cl.
CPC .............. *B65D 75/06* (2013.01); *B29C 65/20* (2013.01); *B29C 2795/002* (2013.01); *B65D 2203/00* (2013.01)

(58) Field of Classification Search
None
See application file for complete search history.

(56) References Cited

U.S. PATENT DOCUMENTS

| 4,733,800 A | 3/1988 | Bjoerkengren et al. |
| 5,569,144 A | 10/1996 | Schwyn |

(Continued)

FOREIGN PATENT DOCUMENTS

| EP | 2004506 A2 | 12/2008 |
| EP | 2089213 A2 | 8/2009 |

(Continued)

OTHER PUBLICATIONS

International Search Report for PCT/IB2022/053779, mailed Aug. 16, 2022, 5 pages.

(Continued)

*Primary Examiner* — Yan Lan
(74) *Attorney, Agent, or Firm* — NIXON & VANDERHYE (57) ABSTRACT

The invention relates to a method for manufacturing a tubular body (2) for a packaging in tube form (1), comprising the following steps: —) definition of the geometrical characteristics of the tubular body (2) to be produced; —) creation of an initial image (6) covering the surface of the tubular body (2) to be produced, said initial image (6) having a right lateral edge and a left lateral edge; —) creation of an intermediate image (8) from the initial image (6) by adding a lateral strip (13) to one of said edges of the initial image (6), said lateral strip (13) comprising a copy of the other of said edges of the initial image (6); —) printing of at least one intermediate image (8) on a sheet, the intermediate image (8) being disposed such that the lateral edges of the image are parallel to the direction of unwinding of the sheet; —) cutting of a small strip on each lateral side of the intermediate image (8) to form a final image (10); —) shaping of the sheet as tubular body (2) and edge-to-edge assembly to obtain a continuity of the design between the right edge and the left edge of the image.

15 Claims, 6 Drawing Sheets

(56) References Cited

U.S. PATENT DOCUMENTS

| | | | |
|---|---|---|---|
| 2009/0092792 A1 | 4/2009 | Thomasset et al. | |
| 2009/0176044 A1 | 7/2009 | Thomasset et al. | |
| 2009/0286025 A1* | 11/2009 | Thomasset | B32B 27/36 |
| | | | 156/160 |
| 2010/0000674 A1 | 1/2010 | Voigtmann | |
| 2011/0041991 A1 | 2/2011 | Thomasset | |
| 2013/0313283 A1 | 11/2013 | Medico et al. | |
| 2015/0132517 A1 | 5/2015 | Thomasset et al. | |
| 2017/0028608 A1 | 2/2017 | Keller et al. | |
| 2019/0299558 A1* | 10/2019 | Limatibul | B29C 66/4322 |
| 2020/0070464 A1 | 3/2020 | Thomasset | |
| 2021/0291422 A1 | 9/2021 | Thomasset et al. | |

FOREIGN PATENT DOCUMENTS

| | | | | |
|---|---|---|---|---|
| EP | 2004389 | B1 | 1/2011 | |
| EP | 2007567 | B1 | 8/2011 | |
| EP | 2720850 | * | 5/2015 | B29C 66/7234 |
| EP | 2720850 | B1 * | 5/2015 | B29C 66/7234 |
| EP | 2720849 | B1 | 8/2015 | |
| EP | 2004506 | B1 | 11/2017 | |
| EP | 3300881 | A1 | 4/2018 | |
| JP | H08324600 | A | 12/1996 | |
| JP | 2009532297 | A | 9/2009 | |
| JP | 2013540082 | A | 10/2013 | |
| JP | 2015527258 | A | 9/2015 | |
| JP | 2020518488 | A | 6/2020 | |
| RU | 13025 | U1 | 3/2000 | |
| RU | 184686 | U1 | 11/2018 | |
| WO | 2007113780 | A2 | 10/2007 | |
| WO | 2007113781 | A2 | 10/2007 | |
| WO | 2007113782 | A2 | 10/2007 | |
| WO | 2008038206 | A2 | 4/2008 | |
| WO | 2009125330 | A2 | 10/2009 | |
| WO | 2012052971 | A2 | 4/2012 | |
| WO | 2013186723 | A2 | 12/2013 | |
| WO | 2015159234 | A1 | 10/2015 | |
| WO | 2015182616 | A1 | 12/2015 | |
| WO | 2018051235 | A1 | 3/2018 | |

OTHER PUBLICATIONS

Written Opinion of the ISA for PCT/IB2022/053779, mailed Aug. 16, 2022, 5 pages.

Tetra Pak: "Design Manual Information & 1 Specification Package Types Package Types", Oct. 4, 2021, pp. 1-14, XP055847312.

Amagoo Ag, "Amagoo Ag—3D Packaging", Oct. 4, 2021, pp. 1-5, XP055847319.

Office Action, issued in Russian Patent Application No. 202312931805(065113) dated Apr. 22, 2022.

Office Action, issued in Japanese Patent Application No. 2023-563859 dated Jun. 10, 2025.

Office Action, issued in Japanese Patent Application No. 2023-563859 dated Nov. 11, 2025.

* cited by examiner

PACKAGING IN WHICH THE WELD IS CONCEALED IN THE PRINT AND MANUFACTURING METHOD

REFERENCE TO CORRESPONDING APPLICATIONS

This application is the U.S. national phase of International Application No. PCT/IB2022/053779 filed Apr. 22, 2022, which designated the U.S. and claims priority to EP Patent Application No. EP21170375.6 filed on Apr. 26, 2021, in the name of AISAPACK HOLDING SA, the entire contents of each of which are hereby incorporated by reference.

TECHNICAL FIELD

The invention falls within the field of packagings formed by means of welded or bonded printed sheets. It relates more specifically to the packagings comprising a tubular body obtained by butt-welding or bonding of a sheet. The invention applies to the field of packaging and in particular that of the recyclable flexible tubes intended to contain cream or paste products; or that of the cans replacing aluminium to contain liquids; or that of the flasks for cosmetic products.

STATE OF THE ART

The butt-welding of sheet structures to manufacture tube bodies is already described in the prior art, and notably in the publications U.S. Pat. Nos. 5,569,144, 4,733,800, EP2720849, EP2720850, EP2007567, EP2004506, EP2004389.

The publications EP2720849 and EP2720850 teach a method for butt-welding a multilayer sheet to form a tubular body. The publication EP2720849 proposes bevel-cutting the edges with different angles so as to form a slight overlap of the edges of the sheet in the weld zone. The publication EP2720849, for its part, teaches bevel-cutting the edges of the sheet and exerting a circumferential pressure on said edges during the welding operation. These publications do not teach how to obtain a continuity of the design in the welded zone to conceal the weld.

The publications EP2007567, EP2004506, EP2004389 notably propose adding a reinforcing strip at the butt weld at the ends in order for the weld to have a sufficient strength. The butt-welding proposed in these publications also allows for a tubular body that has a decoration in the weld zone. The possibility of masking the weld zone by the decoration is a great advantage in the field of packaging, above all when it is intended for the cosmetic sector. However, the prior art does not make it possible to obtain continuity of the decoration on the two sides of the weld with great precision.

The publications EP2720849, EP2720850, EP2007567, EP2004506 and EP2004389 allow a significant improvement of the aesthetics of the welded packagings because they make it possible to apply the decoration in the weld zone. However, the designs that can be used in the weld zone remain generally limited because a slight offset is regularly observed between the left part and the right part of the weld.

The publication EP3300881 proposes a method for cutting the edges of the printed sheet before welding to improve the aesthetics of the welding of the ends of a printed sheet; said ends being lap-welded. The method proposes using the edges of the printed snapshot to control the position of the cut. This method makes it possible to improve the aesthetics of the welds by overlap but cannot be applied to the butt-welding to resolve the problem of offset of the patterns on either side of the weld.

The aim of the invention is to improve the known methods.

More particularly, the aim of the invention is to propose simple means for producing a tubular body decorated over its entire surface in which the weld is not visible.

The invention makes it possible to remedy the abovementioned drawbacks. In particular, the invention makes it possible to produce a butt weld with a continuity of the design in the welded zone in order to conceal the weld and avoid the visible offsets which occur in the state of the art.

SUMMARY AND PRINCIPLE OF THE INVENTION

The invention relates to a method for producing tubes by welding of a printed sheet and that have a so-called "360°" decoration; that is to say one which extends over its entire periphery.

The invention relates notably to a method that makes it possible to conceal the weld zone in the design.

More specifically, the invention relates to a method for manufacturing a tubular body continuously, consisting at least in printing a series of successive images on a reel-packaged sheet; in paying out said sheet thus defining a scrolling direction, in cutting the lateral edges of said sheet in order for the remaining width of the sheet to be matched with the diameter of the tubular body to be produced, in shaping the sheet into tubular geometry, in butt-welding the lateral edges of the sheet, then in cutting the tubular body at right angles to the scrolling direction and in synchronism with the images.

In embodiments, the invention is characterized notably by the fact that the width of the printed image on the sheet is greater than the perimeter of the tubular body to be produced and by the fact that a first part situated on the left edge of the image is identical to a second part situated on the right edge of the image; said left and right parts forming two parallel lateral strips of identical width.

According to embodiments of the invention, an operation of cutting of the edges of the sheet is performed to match the final width of the sheet with the diameter of the tubular body to be produced. According to embodiments of the invention, the cutting of the edges falls within the lateral strips.

According to embodiments of the invention, the diameter of the tubular body to be produced is used to define the dimensions of an image, called "initial image". The width of the initial image is defined by the perimeter of the tubular body to be produced and the height of the initial image is defined by the length of the tubular body.

According to embodiments of the invention, the initial image is used to produce an image called "intermediate image" by adding, on the left of the initial image, a lateral strip corresponding to the copy of the right lateral edge of the initial image; or, conversely, by adding, on the right of the initial image, a lateral edge corresponding to the copy of the left lateral edge of the initial image. Thus, the intermediate image comprises at least two identical zones situated on the lateral edges.

A succession of intermediate images is printed on a sheet which is then packaged on a parent reel, the lateral edge of the image being parallel to the direction of unwinding of the sheet. The printing of the sheet can be done in one or more tracks. The routine operations of the cutting of the printed sheet makes it possible to adjust the widths and package the intermediate images in "child reels"; the child reels comprising only a single track of images.

In the process of manufacturing the tubular body according to embodiments of the invention, the width of the intermediate image is then reduced by cutting of a small strip on each lateral edge. The image obtained after cutting of the edges is called "final image", which is characterized by a continuity of the design between the left lateral edge and the right lateral edge.

When carrying out embodiments of the invention, the criterion of continuity of the design between the left edge and the right edge of the final image is used to adjust the remaining width of the sheet. The remaining width predetermines the diameter of the tubular body which is obtained by juxtaposing and butt-welding the lateral edges of the sheet after cutting of the small strip on each lateral edge. Ultimately, a tubular body with a 360° decoration is obtained.

Differences are generally observed between the theoretical diameter and the real diameter of the tubular body. These small differences can result from dimensional variations of the sheet under the effect of mechanical and/or thermal stresses. An optimization of the final width of the sheet and of the diameter of the tubular body according to the invention is consequently necessary to obtain the 360° decoration as specified in the invention.

The variations inherent in the manufacturing devices create greater or lesser variations in the manufactured products. These variations can be reduced by using more or less sophisticated regulation methods. However, these regulation methods in themselves do not make it possible to obtain the visual quality sought at the butt weld and in the continuity of the design on each side of the weld.

One great advantage of the invention and of its embodiments is to make it possible to largely overcome variations at the butt weld which could be created by the manufacturing device. Thus, according to embodiments of the invention, the width of the printed lateral strips is greater than the amplitude of the position variations of the sheet at right angles to the scrolling axis. For example, the position of the sheet may vary at right angles to the scrolling axis in the printing or in the cutting of the edges of the sheet. According to embodiments of the invention, the width of the lateral strips is such that the cutting of the edges is always situated in said lateral strips.

According to embodiments of the invention, the method can be optimized in order to reduce the waste created by the cutting of the edges. To this end, sheet guiding systems can be used to limit the variations of the method. Thus, guiding systems using one or more sensors detecting the lateral position of the strip during the printing make it possible to regulate the lateral position of the sheet and thus reduce the position variations of the images with respect to the edge of the sheet. Alternatively, fixed guiding means can be used.

A second system advantageously used makes it possible to regulate the position of the sheet during the cutting of the edges before the operation of forming of the tubular body. According to a preferred embodiment, the second system comprises one or more sensors detecting the lateral position of the image and regulating the lateral position of the sheet during the cutting of the edges. According to an alternative method, the sensor detects the edges of the sheet for the regulation. According to another embodiment, fixed guiding means are used.

According to embodiments of the invention, the method also comprises a step of final adjustment of the diameter of the tubular body, the diameter of the tubular body being predefined by the final image. A first embodiment consists in adjusting the diameter prior to the welding operation. An alternative embodiment consists in adjusting the diameter concurrently with the welding operation.

According to embodiments, the invention relates also to a packaging of which at least a part is manufactured by a method according to the invention.

According to these embodiments, the invention relates more specifically to a packaging comprising a weld concealed in the design.

More specifically, the invention relates to a packaging comprising at least one tubular body decorated and manufactured from a sheet printed and butt-welded according to the principles of the present invention.

More specifically, according to embodiments, the invention relates to a tube comprising a flexible tubular body and decorated according to the method described in the present application, one end of which is linked to a tube head; and the other end of which is pinched and welded on itself forming a so-called final weld. The tube head comprises at least one orifice for the extraction of the product contained in the packaging. The packaging can also comprise means for opening and closing said packaging.

The tube as described previously preferably comprises two main faces imposed geometrically by the final weld and possibly by an opening system such as a hinged plug. The two main faces of the tube are used as vector of communication with, for example, decorations, images or appropriate prints.

The invention notably makes it possible to obtain packagings with complex decorations without discontinuity on each face. According to embodiments of the invention, the longitudinal weld is concealed in one of the two faces.

The principles of the invention for example make it possible to position the weld on one of the faces of the packaging without the latter being visible and modifying the aesthetics of the tube.

According to an embodiment of the invention, the butt-welding can comprise an addition of material on the side of the inner face of the tubular body; the addition of material reinforcing the butt weld. According to an embodiment of the invention, the addition of material can be a welded strip or extruded material. This addition of material can be placed on the inner surface of the tubular body or at least partially embedded in the thickness of the tubular body.

According to embodiment of the invention, the weld is difficult to detect on the decorated outer face of the packaging and therefore invisible for the user.

The embodiments of the invention allow a continuity of the design on either side of the weld and thus make it possible to avoid the discontinuities of the patterns or colours at the weld.

The embodiments of the invention make it possible to use all the surface of the tubular body as communication vector.

The embodiments of the invention make it possible to locate the weld at the optimal point to obtain great packaging strength together with optimal aesthetic properties.

In embodiments, the invention relates to a method for manufacturing a tubular body for a packaging, said method notably comprising the following steps:
  definition of the geometrical characteristics of the tubular body to be produced;
  creation of an initial image covering the surface of the tubular body to be produced, said initial image having a right lateral edge and a left lateral edge;
  creation of an intermediate image from the initial image by adding a lateral strip to one of said edges of the initial image, said lateral strip comprising a copy of the other of said edges of the initial image;

printing of at least one intermediate image on a sheet, the intermediate image being disposed such that the lateral edges of the image are parallel to the direction of unwinding of the sheet;

cutting of a strip, preferably a small strip, on each lateral side of the intermediate image to form a final image;

shaping of the sheet as a tubular body and edge-to-edge assembly to obtain a continuity of the design between the right edge and the left edge of the image.

In embodiments, a succession of intermediate images can be printed on a sheet.

In embodiments, the images can be printed on several parallel tracks and a sheet can be wound to obtain a single track of images.

In embodiments, the characteristics of the tubular body can be the diameter and/or the length and/or the thickness.

In embodiments, the initial image can comprise a design formed by image(s), drawing(s), plain or shaded colour(s) or a combination thereof.

In embodiments, the edge-to-edge assembly can be performed by welding of the sheet or by extrusion of a tubular body on the inner face of the sheet.

In embodiments, the edge-to-edge welding can comprise steps of heating, pressing and cooling of the ends of the sheet.

In embodiments, after the welding operation an addition of material to reinforce the welded zone can be performed, the addition of material being performed for example on the inner face of the tubular body and/or the outer face of the tubular body.

In embodiments, the addition of material can be done in the form of a plastic strip which is welded or bonded onto the ends of the sheet, or by addition of a bead of extruded material.

In embodiments, the tubular body can be cut into segments, the operation of cutting into segments being synchronized with the images.

In embodiments, the sheet can be a single-layer or multilayer film.

In embodiments, the sheet can be a laminate.

In embodiments, the sheet can be based on synthetic material(s), on cellulose, on biosourced material(s), on recycled material(s), on biodegradable material(s), or a mixture of said materials.

In embodiments, the invention relates to a packaging comprising a tubular body obtained by a method as described in the present application.

In embodiments, the packaging can be a tube, or a flask or a can, or any other type of packaging.

DETAILED DESCRIPTION

Figure 1:
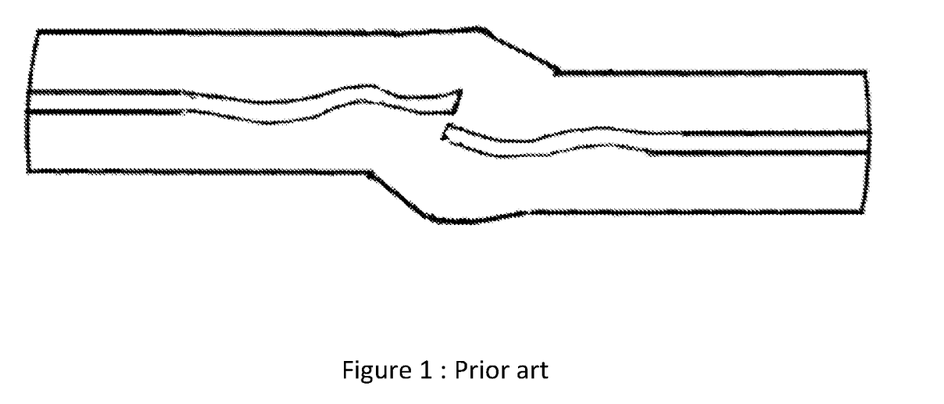
FIG. 1 illustrates an example of edge-to-edge welding according to the prior art, publication EP2720850.
Figure 2:
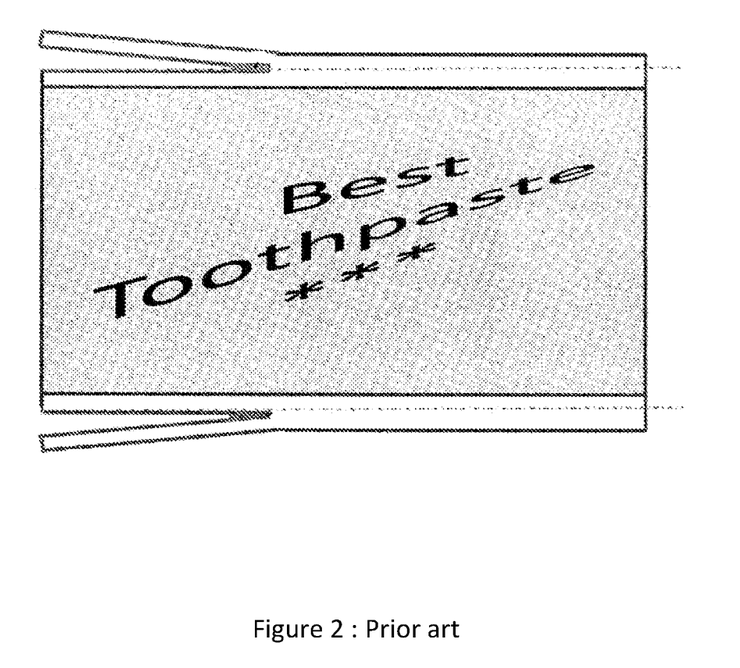
FIG. 2 illustrates the operation of cutting of the lateral edges of the sheet according to the prior art, publication EP3300881.
Figure 3:
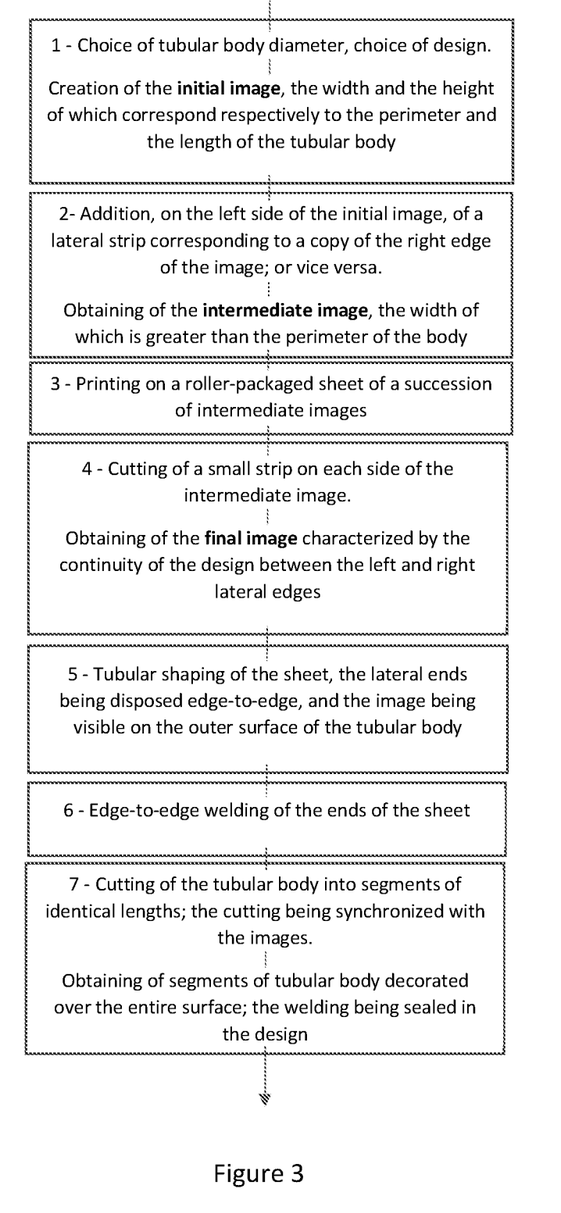
FIG. 3 describes the main steps of the tube production method according to the invention.

1: tube
2: tubular body
3: longitudinal weld
4: tube head
5: end weld
6: initial image
7: width of the initial image
8: intermediate image
9: width of the intermediate image
10: final image
11: width of the final image
12: width of the sheet
13: lateral strip
14: width of the lateral strip
15: position of the left cut
16: position of the right cut
17: unprinted sheet edge FIG. 3 illustrates an example of the steps of the method according to the invention for the production by welding of tubular bodies with 360° design, having a weld concealed in the continuity of the design. According to one embodiment of the invention, the method comprises, for example, the steps described below.

A first step comprises the definition of the geometrical characteristics of the tubular body to be produced, that is to say, for example, its diameter, its width and its thickness. The first step of the method also comprises the creation of the design that is wanted to be shown all around the tubular body. In the context of the present invention the design can be of any type: image(s), drawing(s), plain or shaded colour(s) or a combination thereof, etc. Thus, an image, called initial image, is created, the width and the height of which correspond respectively to the perimeter and the length of the tubular body. The initial image thus perfectly covers the entire surface of the tubular body.

A second step of the method comprises the creation of an intermediate image by adding a lateral strip on the left of the initial image corresponding to a copy of the right edge of the initial image; or vice versa. The intermediate image obtained is wider than the initial image; and, consequently, its width is greater than the perimeter of the tubular body to be manufactured.

A third step comprises the printing of a succession of intermediate images on a sheet which is then packed on a reel for example. The intermediate images are disposed in such a way that the lateral edges of the images are parallel to the direction of unwinding of the sheet. Depending on the width of the sheet, the images can be printed in one or more mutually parallel tracks. In the case where the images are printed in several tracks, the printed sheet is then wound in order to obtain and pack a single track of intermediate images per reel.

A fourth step of the method, called "trimming", comprises the cutting of a small strip on each lateral side of the intermediate image in order to obtain an image called "final image", the final image comprising a continuity of the decoration between its left edge and its right edge when it is shaped as a tubular body. The width of the final image corresponds substantially to the perimeter of the tube to be manufactured. Preferentially, the fourth step is performed in a continuous tubular body manufacturing method in which the printed sheet is unwound, trimmed, shaped as a tube and assembled edge-to-edge (for example by welding). A precise adjustment of the width of the final image is performed to obtain a continuity of the design between the left edge and the right edge of the image.

A fifth step comprises the shaping of the printed sheet in tubular geometry, the printed surface being visible on the outer side of the tube. In this step, the ends of the printed sheet are disposed edge-to-edge and the diameter of the tubular body is adjusted so that the ends of the sheet are in contact without forming any overlap or shrinkage in the print zone.

A sixth step comprises the edge-to-edge welding or bonding of the ends of the sheet. Preferentially, operations of heating, pressing and cooling of the ends of the sheet are used to perform the assemblage. The edge-to-edge welding can comprise an addition of material which reinforces the welded zone. This addition of material can be done in the form of a plastic strip which is welded or bonded onto the ends of the sheet, or by the addition of a bead of extruded material. Preferentially, the addition of the reinforcement is done on the inner face of the tube. The tubular body can also comprise a reinforcement on the outer surface of the weld.

Finally, a seventh step comprises the cutting of the tubular body into segments of similar length; the cutting operation being synchronized with the images. The final cutting operation makes it possible to obtain tubular bodies decorated over the entire circumference, the weld being concealed in the print.

Figure 4:
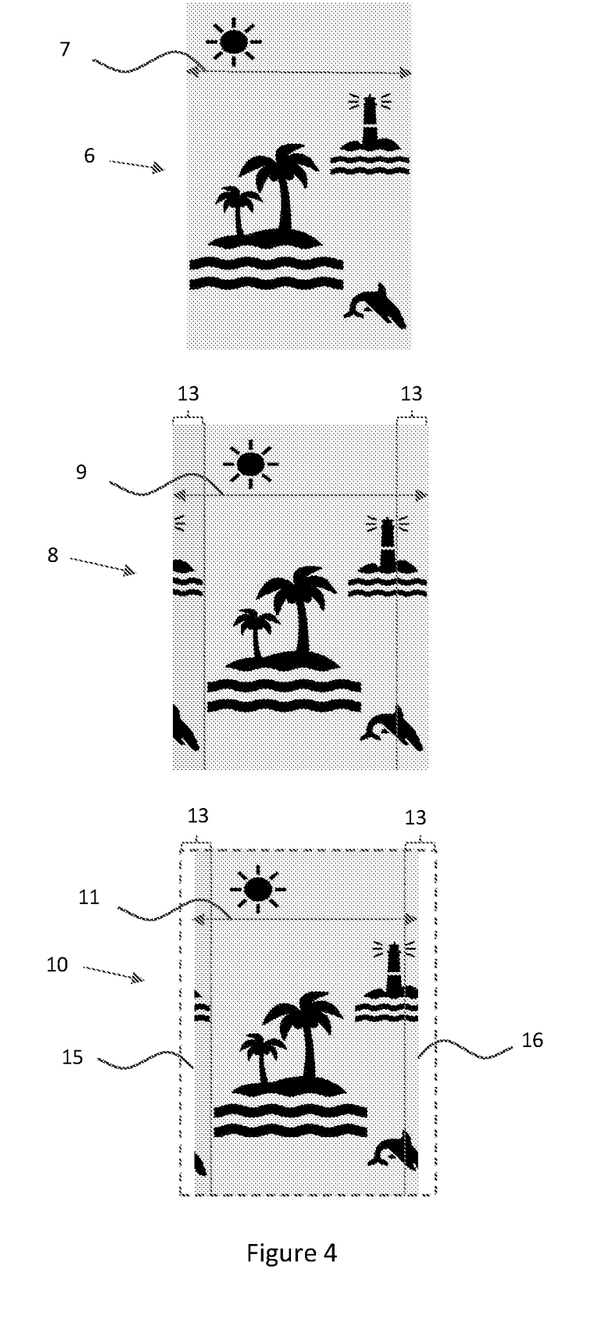
FIG. 4 illustrates the so-called "initial", "intermediate", and "final" images used in the invention.

FIG. 4 illustrates an example of initial image 6, of intermediate image 8 and of final image 10 with a design composed of images/drawings, by way of nonlimiting example. The initial image 6 has a width 7 which corresponds to the perimeter of the outer surface of the tubular body to be produced. The width 7 of the initial image is measured at right angles to the direction of unwinding of the sheet and to the axis of the tubular body. The initial image 6 is a virtual image (not printed) which corresponds to the design that is wanted to be obtained on the tubular body.

FIG. 4 illustrates the intermediate image 8 which is constructed by adding, on the left side of the initial image, a strip 13 copying the strip 13 on the right side of the initial image. Another intermediate image (not represented) could be obtained by copying, on the right side of the initial image, a strip on the left side of the initial image. In all cases, the intermediate image is characterized by the fact that it comprises two identical lateral strips 13 (one being the copy of the other). The lateral strip 13 can comprise images, drawings, plain or shaded colours or a combination thereof, etc., the important factor being that the two lateral edges should be identical. The intermediate image 8 obtained therefore has a width 9 which is greater than the perimeter of the tube that is wanted to be manufactured. The intermediate image 8 is then printed on the sheet being used to manufacture the tubular body by welding of the ends.

As, ultimately, the decoration is situated on a cylindrical body with 360° design, it is shrewd practice to optimize the primary image to choose the zone in which the weld is situated on the packaging. Generally, for a packaging in tube form, having the weld situated at the fold formed by the end weld 5 of the packaging is for example avoided.

FIG. 4 also illustrates the final image 10 that is obtained in the operation of trimming of the edges of the sheet. This operation consists notably in taking a small strip from each side of the sheet in order to create a continuity of the decoration between the left edge and the right edge of the sheet. This trimming operation is necessary in the manufacturing process in order to eliminate the edges of the sheet which might have been damaged in the storage of the reels, and to adjust, with great accuracy, the width of the sheet prior to the formation of the tubular body. FIG. 4 illustrates the width 11 of the final image which is adjusted to obtain a continuity of the design between the left edge and the right edge, a continuity which will be produced upon the edge-to-edge welding of the sheet shaped as a tubular body. The position of the cut 15 and 16 is located inside the strips 13. The distance between the cut position 15 and the cut position 16 is set during production, which allows for negligible variations of the width 11 throughout the production.

Figure 5:
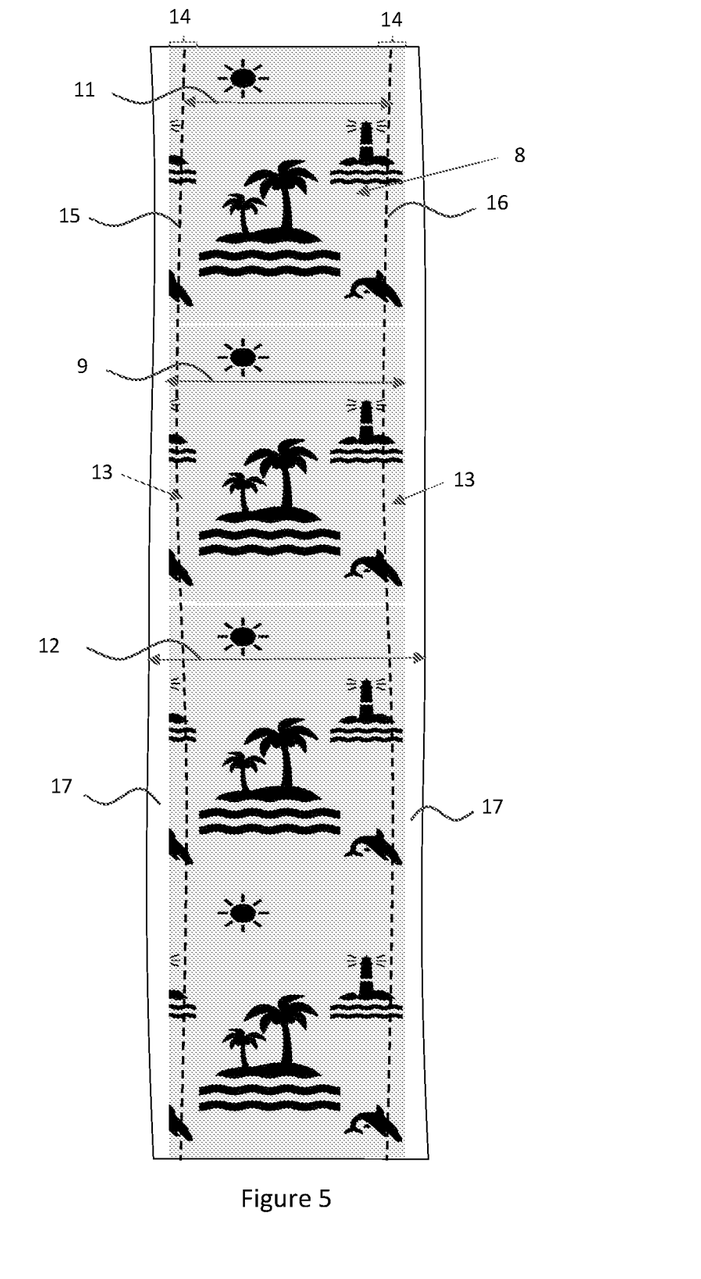
FIG. 5 illustrates the step of cutting of a small strip on each side of the intermediate image.

FIG. 5 illustrates one of the advantages of the invention: it makes it possible to overcome variations of lateral positioning of the sheet in the manufacturing method. FIG. 5 illustrates, in an amplified manner, the principle of the invention which makes it possible to guarantee a continuity of the design between the left edge of the image and the right edge of the image even if the image moves laterally. According to the principles of the invention, the distance between the cut positions 15 and 16 are constant, so the width of the final image 11 is constant even if the image moves laterally with respect to the cut positions. The method according to the invention makes it possible to overcome variations of lateral positions as long as these variations are contained within the lateral strips 13 of width 14 since the strips 13 contain the same image or part of image. Thus, the invention makes it possible to overcome variations of lateral position of the image with respect to the edges of the sheet of width 12, said sheet being able to include an unprinted lateral part 17. The invention makes it possible also to overcome variations of position of the printed sheet with respect to the cut positions 15 and 16. The variations illustrated in FIG. 5 are illustrative and appear in reality over far greater sheet lengths, potentially corresponding to several hundreds of metres. The invention makes it possible to also overcome variations which appear upon change of reel, for example if the design on the second reel is laterally offset with respect to that of the preceding reel.

Figure 6:
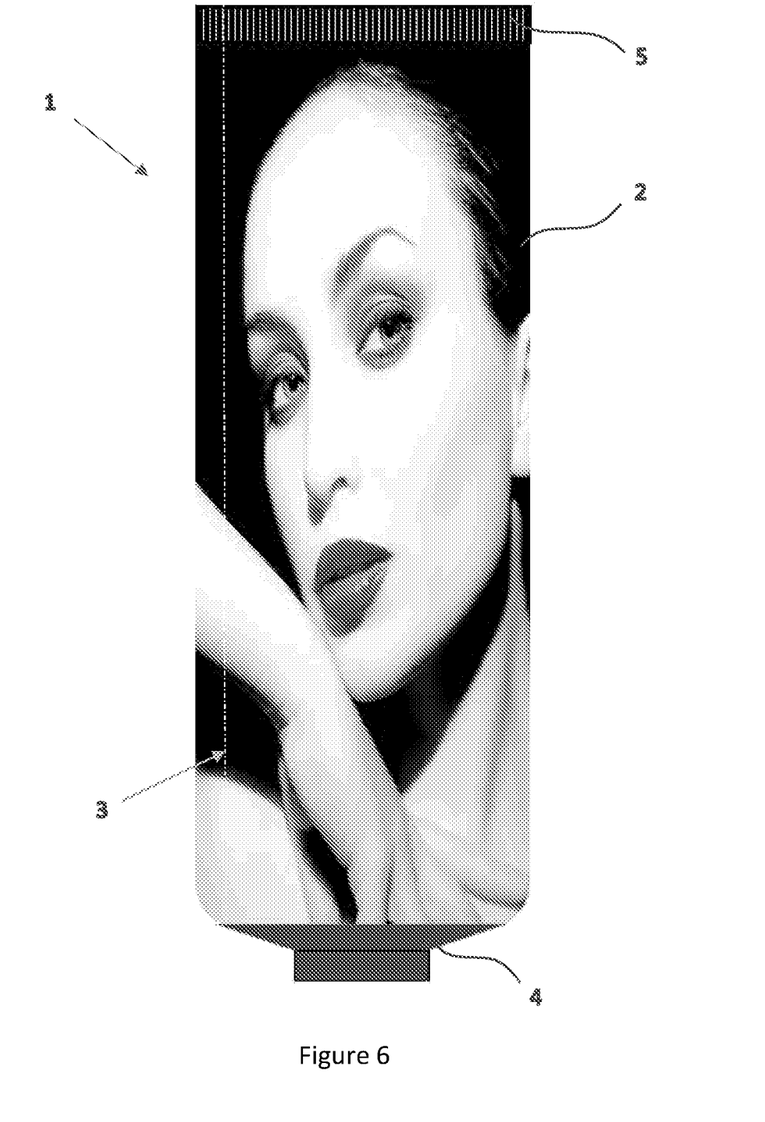
FIG. 6 illustrates a tube with 360° design obtained according to the invention.

FIG. 6 illustrates a packaging in tube form 1 obtained by means of a method according to the invention with a continuity of the design over the circumference. The tube 1 comprises a tubular body 2 fixed to a tube head 4 comprising an orifice for the extraction of the product contained in the packaging. An opening-closing system such as a plug (not represented) is generally associated with the tube head 4. The tubular body 2 is closed on the side opposite the head of the tube by virtue of the end weld 5. The packaging 1 illustrated in FIG. 6 is characterized by the fact that the longitudinal weld 3 of the tubular body 2 is perfectly concealed in the image with a continuity of the design on either side of the longitudinal weld 3.

Figure 7:
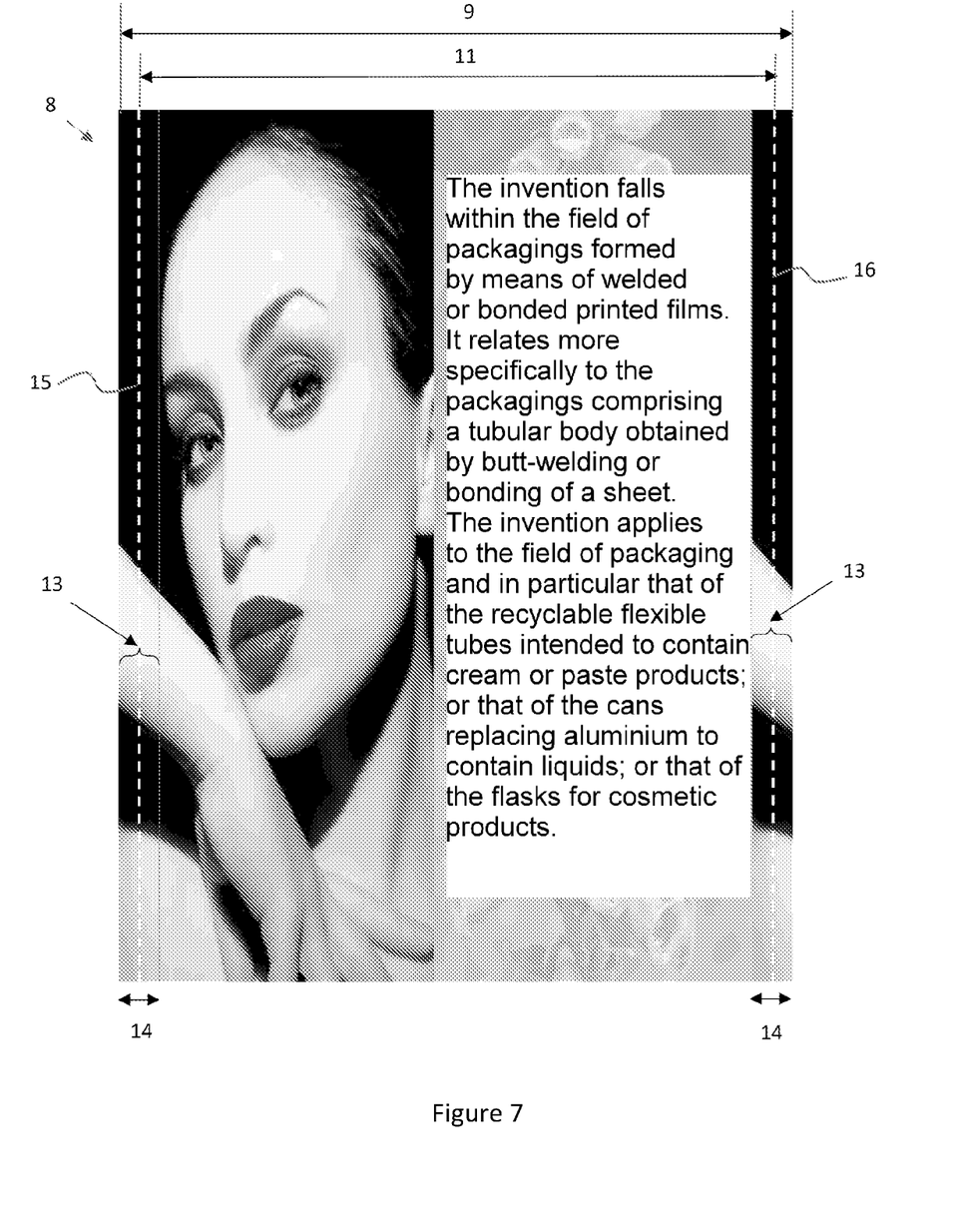
FIG. 7 illustrates the intermediate image used to produce the tube illustrated in FIG. 6.

FIG. 7 illustrates the intermediate image 8 making it possible to produce the packaging illustrated in FIG. 6. The intermediate image comprises two identical lateral strips 13 of width 14 situated on the edges of the image. The cut positions 15 and 16 of fixed width 11 corresponding to the perimeter of the tube to be produced make it possible to obtain the final image by a trimming operation. According to the invention, the cut positions 15, 16 can move laterally within the strip 13 while maintaining a constant separation distance 11. According to the invention, the final image obtained after the trimming operation has a continuity of the design between the left edge and the right edge of the image. This continuity of the design is on the tubular body on either side of the longitudinal weld.

FIG. 7 illustrates the intermediate images 8 of width 9 printed on the sheet of width 12. The cut positions 15 and 16 define the final images of width 11 obtained after the trimming operation and prior to the shaping as a tubular body. The invention makes it possible to overcome small variations of relative lateral positions between the cutting tools 15, 16, the intermediate images and the edges of the sheet.

According to a preferential embodiment of the invention, means are used to laterally guide the sheet in the method and reduce the amplitude of the variations. For example, it is advantageous to use strip guides controlled by cameras which detect either the edge of the sheet, or the lateral position of the image. During the trimming operation, the preferential method is to regulate the lateral position of the sheet as a function of the position of the image. That makes it possible to limit the waste from the trimming operation.

According to embodiments of the invention, the width 14 of the strip 13 must be greater than the amplitude of the variations of the lateral position of the intermediate image 8 with respect to the cut positions 15, 16. According to the invention, the width 14 of the strip 13 is for example between 0.5 and 10 mm and preferentially between 1 and 3 mm.

According to embodiments of the invention, the width of the intermediate image 13 is for example greater by 1 to 10 mm than the perimeter of the tubular body and preferably by 2 to 4 mm.

According to embodiments of the invention, the width of the final image is equal to the width of the initial image allowing for the contractions of the sheet that can take place during the printing operation.

According to embodiments of the invention, the perimeter of the tubular body is equal to the width of the final image allowing for the contractions of the sheet during the edge-to-edge welding operation.

The sheet used in the context of the invention can be a single-layer or multilayer sheet, the thickness of which is between 20 and 500 microns and preferably between 150 and 450 microns.

The sheet can be based on plastic resin, on biosourced material, on recycled material or even on biodegradable material.

The printing of the sheet can be done on the surface or be confined in the multilayer structure of the sheet. In the second case, the printing of the sheet is followed by a lamination step to confine the printing.

The sheet can be printed by separately using or combining several techniques such as, for example, offset printing, UV flexography, screenprinting, typography, thermal transfer printing, digital printing.

The tubular body is manufactured with an edge-to-edge welding method. Many configurations described in the prior art can advantageously be associated with the invention. Thus, the edges of the sheet can be cut at right-angles or at an angle as proposed for example in the patent EP2720849. The edge-to-edge welding can be reinforced by an inner and/or outer strip as proposed for example in the publications EP2007567, EP2004506 and EP2004389. One alternative consists in reinforcing the edge-to-edge weld with a weld bead as described for example in the publication EP2089213.

In embodiments, the sheet can for example be:
composed mainly of cellulose, that is to say of compositions commonly used in the paper industry. These compositions generally comprise a majority of cellulose (for example 70% or more), mineral fillers (for example calcium carbonate or kaolin), colourants or optical brighteners, binders (for example starch or latex), and possibly lignin. According to the invention, the packaging can also comprise thin barrier layers such as, for example, moisture or oxygen barrier layers. These layers can be made of thermoplastic resins such as, for example, PE, PP, EVOH, PVOH, PLA, or thin layers such as SiOx layers or metallized layers or even coatings or nanocoatings;

a multilayer film as described in the publication WO2013/186723, with a reinforcing element as described in that publication;

a laminate as described in the publication WO2007/113782;

a strip as described in the publication WO2009/125330, by using the welding method described in that publication;

a laminate as described in the publication WO2007/113781;

a laminate as described in the publication WO2008/038206;

a laminate as described in the publication WO2007/113780.

A variant of the invention consists in manufacturing the tubular body by extrusion labelling according to the method described in the publications WO2015/159234 and WO2018/051235. In this variant, the thin sheet is printed according to the principles of the present invention. In the continuous extrusion labelling method described in the publications WO2015/159234 and WO2018/051235, the sheet is then trimmed according to the invention prior to its shaping in tubular geometry. Then, a tubular body is extruded on the inner face of the sheet shaped in tubular geometry. The sheet can therefore be a single-layer film as described in these publications for example, or another equivalent film used in the field of packagings as described in the present application.

The embodiments described in the present application are so described as illustrative examples and should not be considered limiting. Other embodiments can use means equivalent to those described for example. The embodiments can also be combined with one another according to circumstances, or means used in one embodiment can be used in another one.

The invention claimed is:

1. Method for manufacturing a tubular body for a packaging, said method comprising the following steps:
    definition of the geometrical characteristics of the tubular body to be produced;
    creation of an initial image covering the surface of the tubular body to be produced, said initial image having a right lateral edge and a left lateral edge;
    creation of an intermediate image from the initial image by adding a lateral strip to one of said edges of the initial image, said lateral strip comprising a copy of the other of said edges of the initial image;
    printing of at least one intermediate image on a sheet, the intermediate image being disposed in such a way that the lateral edges of the image are parallel to the direction of unwinding of the sheet;
    cutting of a strip from each lateral edge of the intermediate image to form a final image;
    shaping of the sheet as a tubular body and edge-to-edge assembly to obtain a continuity of the design between the right edge and the left edge of the image.

2. Method according to claim 1, wherein a succession of intermediate images are printed on a sheet.

3. Method according to claim 1, wherein the images are printed on several parallel tracks and the sheet is wound to obtain a single track of images.

4. Method according to claim 1, wherein the characteristics of the tubular body are the diameter and/or the length and/or the thickness.

5. Method according to claim 1, wherein the initial image comprises a design formed by image(s), drawing(s), plain or shaded colour(s) or a combination thereof.

6. Method according to claim 1, wherein the edge-to-edge assembly is produced by welding of the sheet or by extrusion of a tubular body on the inside face of the sheet.

7. Method according to claim 1, wherein the edge-to-edge welding comprises steps of heating, pressing and cooling of the ends of the sheet.

8. Method according to claim 1, wherein, after the welding operation, material is added to reinforce the welded zone, the addition of material being performed on the inside face of the tubular body and/or the outside face of the tubular body.

9. Method according to claim 1, wherein the addition of material is done in the form of a plastic strip which is welded or bonded onto the ends of the sheet, or by the addition of a bead of extruded material.

10. Method according to claim 1, wherein the tubular body is cut into segments, the operation of cutting into segments being synchronized with the images.

11. Method according to claim 1, wherein the sheet is a single-layer or multilayer film.

12. Method according to claim 1, wherein the sheet is a laminate.

13. Method according to claim 1, wherein the sheet is based on synthetic material(s), on cellulose, on biosourced material(s), on recycled material(s), on biodegradable material(s), or a mixture of said materials.

14. Packaging comprising a tubular body obtained by a method according to claim 1.

15. Packaging according to claim 14, said packaging being a tube, or a flask or a can.

* * * * *